US007467992B2

(12) United States Patent
Sawyer

(10) Patent No.: US 7,467,992 B2
(45) Date of Patent: Dec. 23, 2008

(54) APPARATUS AND METHOD FOR BELLY-CUTTING SHRIMP

(75) Inventor: Derrell Sawyer, Caddo Mills, TX (US)

(73) Assignee: Prawnto Shrimp Machine Company, Caddo Mills, TX (US)

( * ) Notice: Subject to any disclaimer, the term of this patent is extended or adjusted under 35 U.S.C. 154(b) by 0 days.

(21) Appl. No.: 11/809,123

(22) Filed: May 31, 2007

(65) Prior Publication Data

US 2007/0281596 A1 Dec. 6, 2007

Related U.S. Application Data

(60) Provisional application No. 60/809,717, filed on May 31, 2006.

(51) Int. Cl.
*A22C 29/02* (2006.01)
(52) U.S. Cl. ......................................................... 452/3
(58) Field of Classification Search .................. 452/1–3, 452/5–11
See application file for complete search history.

(56) References Cited

U.S. PATENT DOCUMENTS

| | | | | |
|---|---|---|---|---|
| 2,702,921 A | | 3/1955 | Pinney | |
| 4,087,887 A | * | 5/1978 | Hoffman et al. | 452/3 |
| 4,210,982 A | * | 7/1980 | Hoffman et al. | 452/3 |
| 4,439,893 A | * | 4/1984 | Betts | 452/3 |
| 4,472,858 A | * | 9/1984 | Keith | 452/3 |
| 4,769,871 A | * | 9/1988 | Betts | 452/3 |
| 4,843,683 A | * | 7/1989 | Grammer | 452/5 |
| 4,996,744 A | * | 3/1991 | Meyer | 452/3 |
| 5,035,669 A | * | 7/1991 | Betts | 452/5 |
| 5,035,670 A | * | 7/1991 | Pershinske | 452/5 |
| 5,290,199 A | | 3/1994 | Morris | |
| 5,569,065 A | | 10/1996 | Sawyer et al. | |
| 6,273,807 B1 | * | 8/2001 | Shelton | 452/3 |
| 6,533,651 B2 | * | 3/2003 | Keith | 452/3 |

* cited by examiner

Primary Examiner—Thomas Price
(74) Attorney, Agent, or Firm—Steven W. Smith

(57) ABSTRACT

An apparatus and method for mechanically belly-cutting shrimp to precise depths for shrimp of various sizes. The apparatus includes a motorized circular cutting blade; a curved guide channel adjacent the circular cutting blade for receiving a shrimp body and guiding the shrimp body to the circular cutting blade; and motorized flexible disks adjacent to the blade and the guide channel for gripping the shrimp body and propelling the shrimp body along the guide channel. The curvature of the guide channel longitudinally stabilizes the shrimp body while a V-shaped cross-section laterally stabilizes the body, ensuring that the body arrives at the blade in the proper orientation. The guide channel may be adjusted to provide belly-cuts to desired depths on shrimp of various sizes.

14 Claims, 4 Drawing Sheets

APPARATUS AND METHOD FOR BELLY-CUTTING SHRIMP

CROSS-REFERENCE TO RELATED APPLICATIONS

This application claims the benefit of U.S. Provisional Application No. 60/809,717 filed May 31, 2006.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

This invention relates to machines for preparing shrimp for human consumption. More particularly, and not by way of limitation, the invention is directed to an apparatus and method for making belly cuts of precise depth in the bodies of shrimp of various sizes.

In the prior art, devices exist for mechanically cutting the sand vein from the back of the shrimp. Such devices are shown, for example, in U.S. Pat. No. 5,569,065 to Sawyer et al., U.S. Pat. No. 5,290,199 to Morris, and U.S. Pat. No. 2,702,921 to Pinney. In each of these devices, an electric motor turns a set of rotating disks, which grasp the shrimp longitudinally therebetween and pass the convex backside of the shrimp through a rotating circular blade. The blade makes a slice in the backside of the shrimp approximately the same width as the sand vein, thereby cutting the vein away.

Machines for deveining shrimp, however, are not capable of making other types of cuts in the shrimp bodies. Shrimp are consumed in many areas of the world, and with different types of cuisine, different types of cuts have to be made to the shrimp. In many dishes, such as Japanese or other Asian dishes, the shrimp are cut in a sushimi or butterfly cut from the belly side. To make a frontal butterfly cut manually, a chef must lay the shrimp down with the tail away from him, and then cut with a knife from head to tail along the belly, being careful that the knife only goes halfway in. The chef then uses the knife or his fingers to open out and flatten the shrimp carefully, without breaking the uncut flesh along the backside of the shrimp. This is a slow and laborious process, especially when large numbers of shrimp have to be prepared, for example in a restaurant or fish market.

As noted above, existing shrimp deveining machines are not capable of making the belly-side sushimi or butterfly cut. The deveining machines depend on the convex curvature of the back of the shrimp to ensure that the sand vein is removed while not cutting the shrimp in half. If a shrimp body is merely turned around and placed in a deveining machine, the resulting concave curvature of the body causes the blade to cut the shrimp into two pieces.

In order to overcome the disadvantages of existing solutions, it would be advantageous to have an apparatus and method for mechanically belly cutting shrimp to precise depths for shrimp of various sizes. The present invention provides such an apparatus and method.

SUMMARY OF THE INVENTION

The present invention provides an apparatus and method for mechanically belly cutting shrimp to precise depths for shrimp of various sizes.

Thus in one aspect, the present invention is directed to an apparatus for mechanically belly-cutting a shrimp body having a belly side and a back side. The apparatus includes a motorized circular cutting blade; a guide channel adjacent the circular cutting blade for receiving a shrimp body placed into the apparatus and guiding the shrimp body to the circular cutting blade; and motorized means adjacent to the circular cutting blade and the guide channel for gripping the shrimp body and propelling the shrimp body along the guide channel in a manner that the circular cutting blade impacts the belly side of the shrimp body. Preferably, the guide channel is an arcuate channel having a V-shaped cross-section, and the shrimp body is placed in the guide channel with the back side of the shrimp body facing an apex of the V-shaped cross-section. The curvature of the guide channel longitudinally stabilizes the shrimp body as the body is propelled along the guide channel while the V-shaped cross-section laterally stabilizes the shrimp body. These features ensure the shrimp body arrives at the cutting blade in the proper orientation for a belly cut to the desired depth.

In another aspect, the present invention is directed to a method of mechanically belly-cutting a shrimp body having a belly side and a back side. The method includes placing the shrimp body in an arcuate guide channel having a V-shaped cross-section, wherein the shrimp body is placed in the guide channel with the back side of the shrimp body facing an apex of the V-shaped cross-section so that a radius of curvature of the guide channel longitudinally stabilizes the shrimp body as the body moves along the guide channel, and the V-shaped cross-section laterally stabilizes the shrimp body as the body moves along the guide channel. The method also includes propelling the shrimp body along the guide channel with a motorized propelling mechanism, and cutting the belly side of the shrimp body with a motorized circular cutting blade. The guide channel positions and stabilizes the shrimp body so that the circular cutting blade impacts the belly side of the shrimp body and cuts the shrimp body to the desired depth.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE INVENTION

The present invention is directed to an apparatus for making belly cuts of precise depth in the bodies of shrimp of various sizes. Through precision control of the depth of the belly cut, the apparatus creates frontal butterfly cuts equivalent to the manual butterfly cuts now so laboriously performed by chefs.

Thus, the apparatus cuts raw, headless shrimp on the belly side evenly from front to tail at a depth not to break the skin of the shrimp on the back side. The machine utilizes a set of flexible feeder disks to pull the shrimp past a spinning blade. A curved stainless steel guide channel holds the shrimp body straight until it reaches the blade. The depth of the cut can be controlled with a depth adjustment knob on the side of the apparatus. This enables the depth of the cut to be controlled for various sizes of shrimp.

Figure 1A:
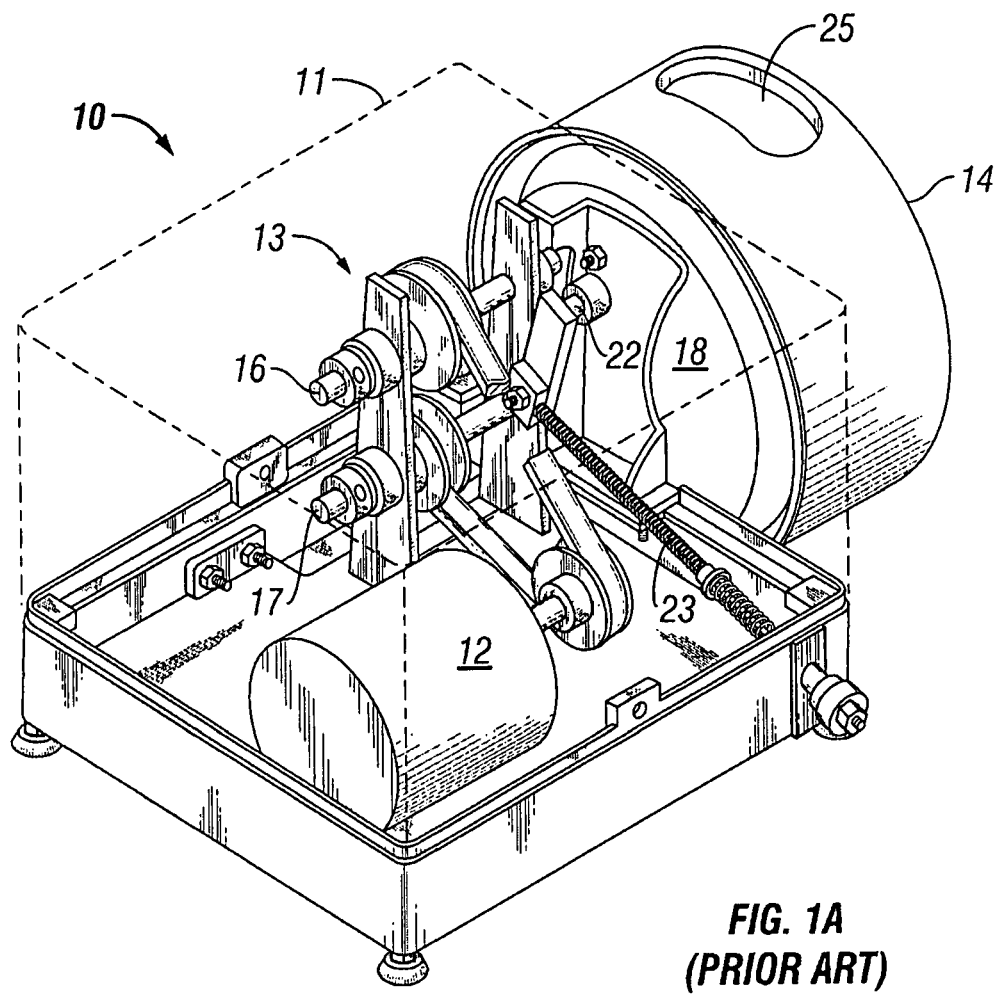
FIG. 1A (Prior Art) is a frontal, left-side perspective view of an existing shrimp cutting machine with a housing shown in phantom for an internal motor and drive mechanism, and with a protective shield covering an external cutting mechanism.
Figure 1B:
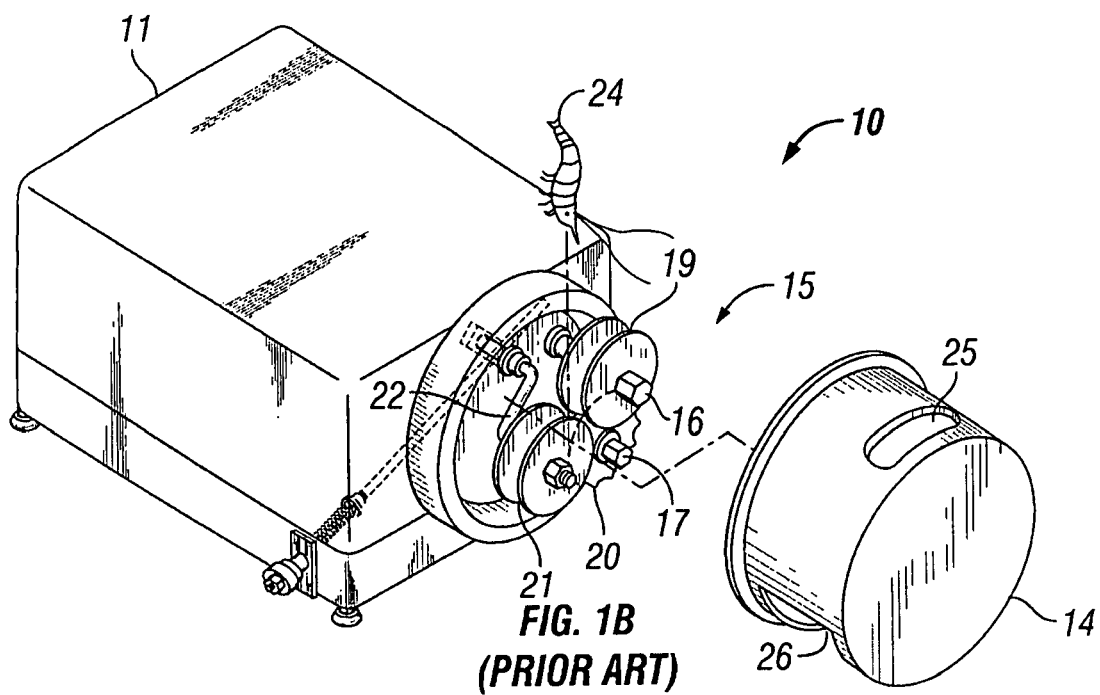
FIG. 1B (Prior Art) is a frontal, right-side perspective view of the existing shrimp cutting machine of FIG. 1A with the housing covering the internal motor and drive mechanism, and with the protective shield removed to reveal the external cutting mechanism.

FIG. 1A is a frontal, left-side perspective view of an existing shrimp cutting machine 10 with a housing 11 shown in phantom containing an internal motor 12 and belt-and-pulley drive mechanism 13. A protective shield 14 covers an external cutting mechanism. FIG. 1B is a frontal, right-side perspective view of the existing shrimp cutting machine of FIG. 1A showing the external cutting mechanism 15. The motor and drive mechanism rotate two shafts 16 and 17, which extend through an end plate 18 of the housing. The upper drive shaft 16 drives an upper pair of flexible disks 19. The lower drive shaft 17 drives a circular saw blade 20. A lower pair of flexible disks 21 is mounted on an adjusting shaft 22. The lower pair of flexible disks freewheels on the adjusting shaft.

In operation, a shrimp body 24 is dropped head first through an opening 25 in the shield with the back of the shrimp facing toward the back of the machine. The upper pair of flexible disks 19 rotate in a counter-clockwise direction. They grab the shrimp body and propel it past the rotating circular blade 20, which cuts the sand vein out of the back of the shrimp body. The deveined shrimp body then falls through a large opening 26 in the bottom of the shield into a holding container (not shown). By turning an adjusting screw 23, the adjusting shaft 22 is rotated, thereby moving the lower pair of flexible disks 21 closer to the blade. In this way, the depth of the cut can be adjusted for different sizes of shrimp.

As noted above, the shrimp deveining machine is not capable of making the belly-side sushimi or butterfly cut. The deveining machine depends on the convex curvature of the back of the shrimp to ensure that the sand vein is removed while not cutting the shrimp in half. If a shrimp body is merely turned around and placed in the deveining machine, the resulting concave curvature of the body causes the blade to cut the shrimp into two pieces.

Figure 2:
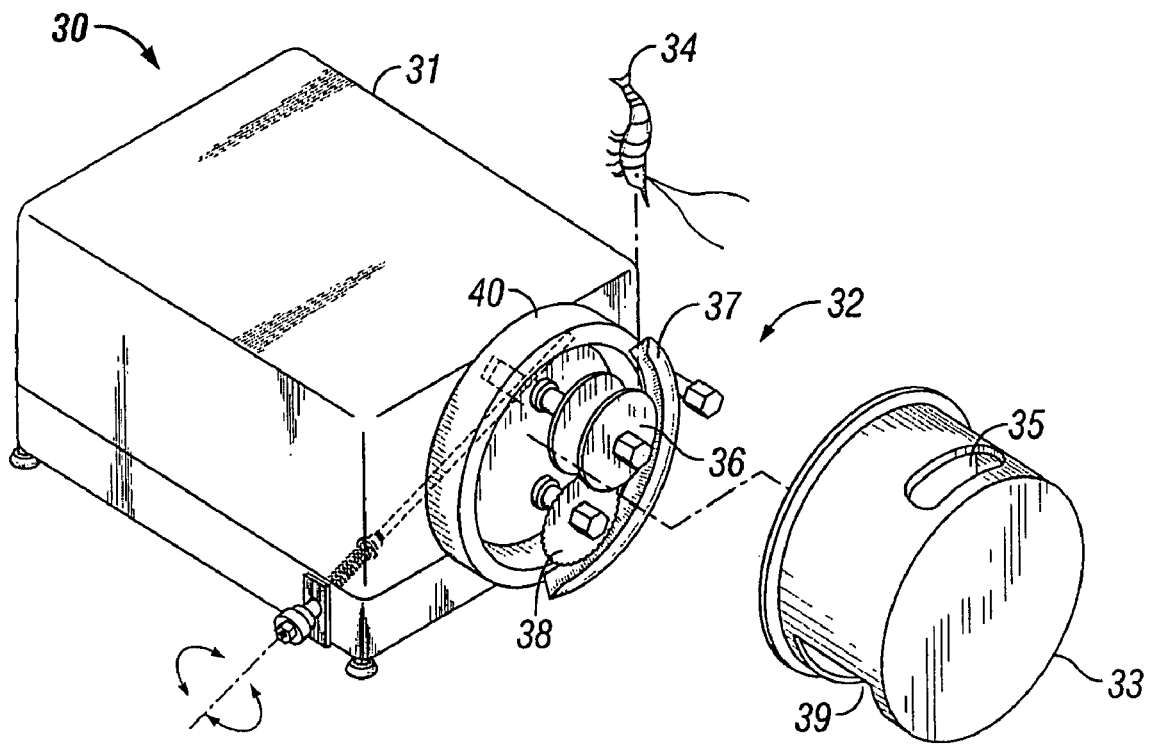
FIG. 2 is a frontal, right-side perspective view of the preferred embodiment of the apparatus of the present invention showing a housing for an internal motor and drive mechanism, an external cutting mechanism, and with a protective shield removed.

FIG. 2 is a frontal, right-side perspective view of the preferred embodiment of the apparatus 30 of the present invention showing a housing 31 for an internal motor and drive mechanism, an external cutting mechanism 32, and with a protective shield 33 removed. In operation, a shrimp body 34 is dropped head first through an opening 35 in the shield with the back of the shrimp facing toward the back of the machine. A pair of flexible disks 36 rotate in a clockwise direction. They grab the shrimp body and propel it along an arcuate (i.e., longitudinally curved) guide channel 37. The curve of the guide channel longitudinally stabilizes the shrimp body as it slides along the guide channel. In addition, the guide channel has a V-shaped cross-section which laterally stabilizes the shrimp body so that the belly side remains centered. The shrimp body continues down the guide channel past a rotating circular blade 38, which cuts the belly of the shrimp body to a pre-set depth. The blade is preferably a smooth, sharpened, round stainless blade. The belly-cut shrimp body then falls through a large opening 39 in the bottom of the shield into a holding container (not shown). The protective shield may be slidably engaged over a circular housing plate 40 for safety protection from the blade. The shield also serves to retain flying debris, which is created by the high-speed blade as it cuts the belly of the shrimp.

Figure 3:
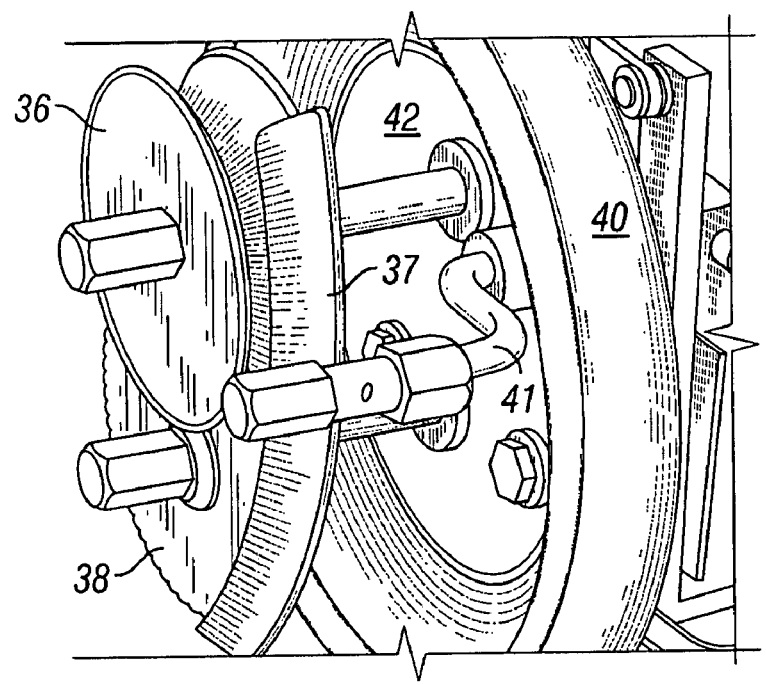
FIG. 3 is a rear, right-side perspective view of the external cutting mechanism of the present invention showing an adjusting shaft for a curved guide channel.

Referring to FIG. 3, there is shown a rear, right-side perspective view of the external cutting mechanism 32 of the present invention. In this view, an adjusting shaft 41 is shown to extend from the circular housing plate 40 mounted on the side of the housing 31. The adjusting shaft attaches to the back of the curved guide channel 37. The exterior portion of the adjusting shaft has two equal-but-opposite bends in it to form a parallel portion, which is offset from the axis of rotation of the adjusting shaft. When the adjusting shaft is rotated by an adjusting screw 42 (see FIG. 4) from inside the housing, the offset parallel portion of the adjusting shaft selectively moves the curved guide channel closer to or farther away from the blade 38.

The flexible disks 36 are preferably constructed of an elastomeric material, which may be, for example, a polyurethane formulation from Bayer Corporation and molded into disks by Micro Mould, Inc. of Fort Worth, Tex. The flexible disks may be constructed of polyurethane of a thickness of approximately 0.04 inches, and an inner section may be angled off of the vertical by approximately eight degrees. An outer section of the disks may be angled off the vertical approximately thirty-five degrees. The flexible disks 36 have the proper degree of flexibility and rigidity to properly grasp and propel shrimp downward through the curved guide channel 37 to the blade 38.

Figure 4:
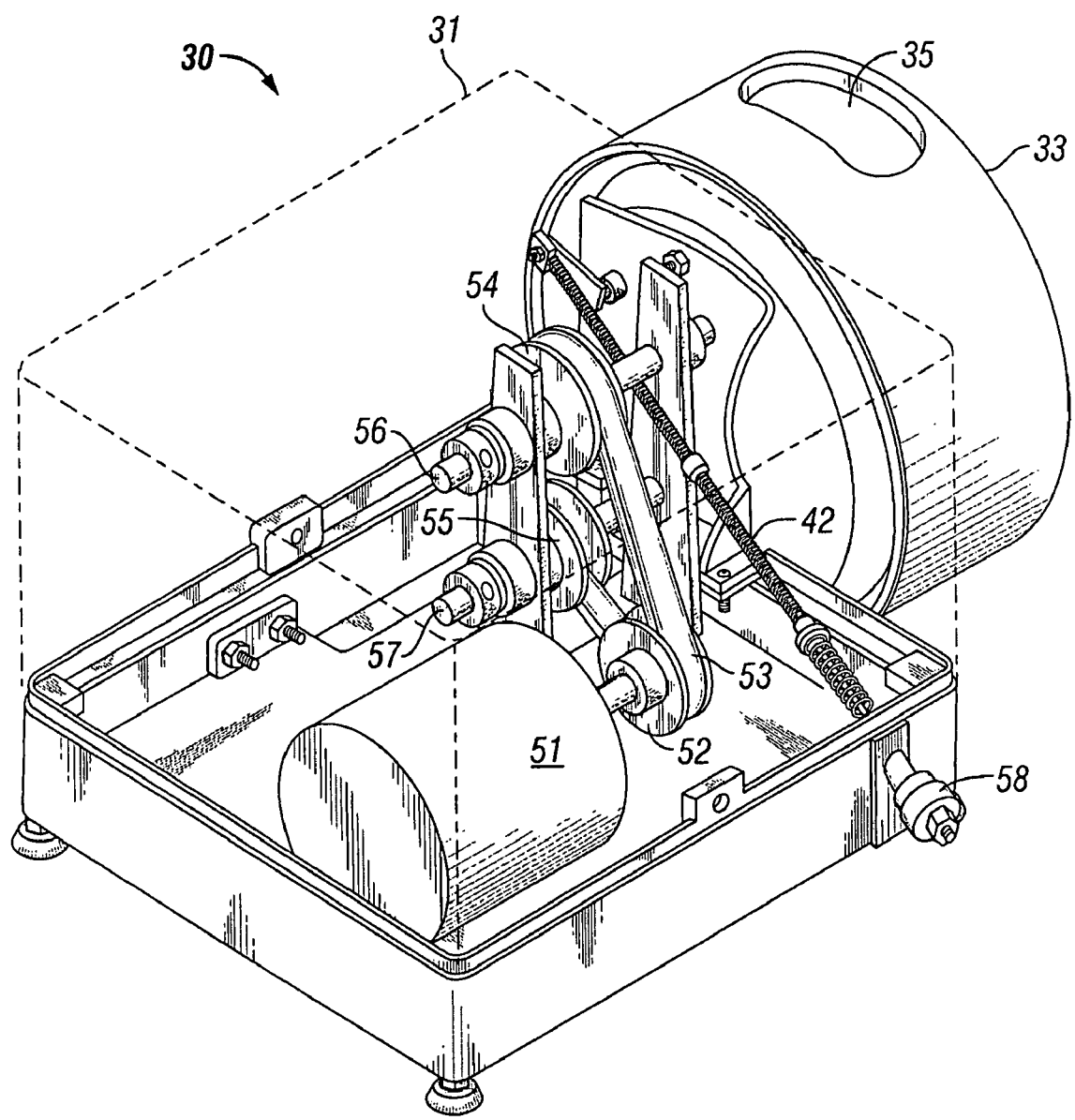
FIG. 4 is a frontal, left-side perspective view of the preferred embodiment of the apparatus of the present invention showing an internal drive mechanism, and with a motor housing shown in phantom.

FIG. 4 is a frontal, left-side perspective view of the preferred embodiment of the apparatus 30 of the present invention showing an internal drive mechanism, and with the motor housing 31 shown in phantom. The drive mechanism may include, for example, a motorized belt-and-pulley system that includes an electric motor 51, motor pulley 52, drive belt 53, upper pulley 54, and lower pulley 55. The upper pulley 54 is mounted on an upper shaft 56. The lower pulley 55 is mounted on a lower shaft 57.

The polarity of the electric motor 51 is reversed in comparison to the prior art motor 12 of FIG. 1A. Thus, the drive mechanism turns both the upper shaft 56 and the lower shaft 57 in a counter-clockwise direction as viewed in FIG. 4 (clockwise direction as viewed in FIG. 2).

An adjusting knob 58 on the front side of the apparatus rotates the screw shaft 42, which causes the adjusting shaft 41 to rotate. This causes the curved guide channel 37 to selectively move closer to or farther away from the blade 38. In this way, the depth of the belly cut can be adjusted to desired, predefined depths, and the apparatus can be used to belly-cut shrimp of different sizes.

Figure 5:
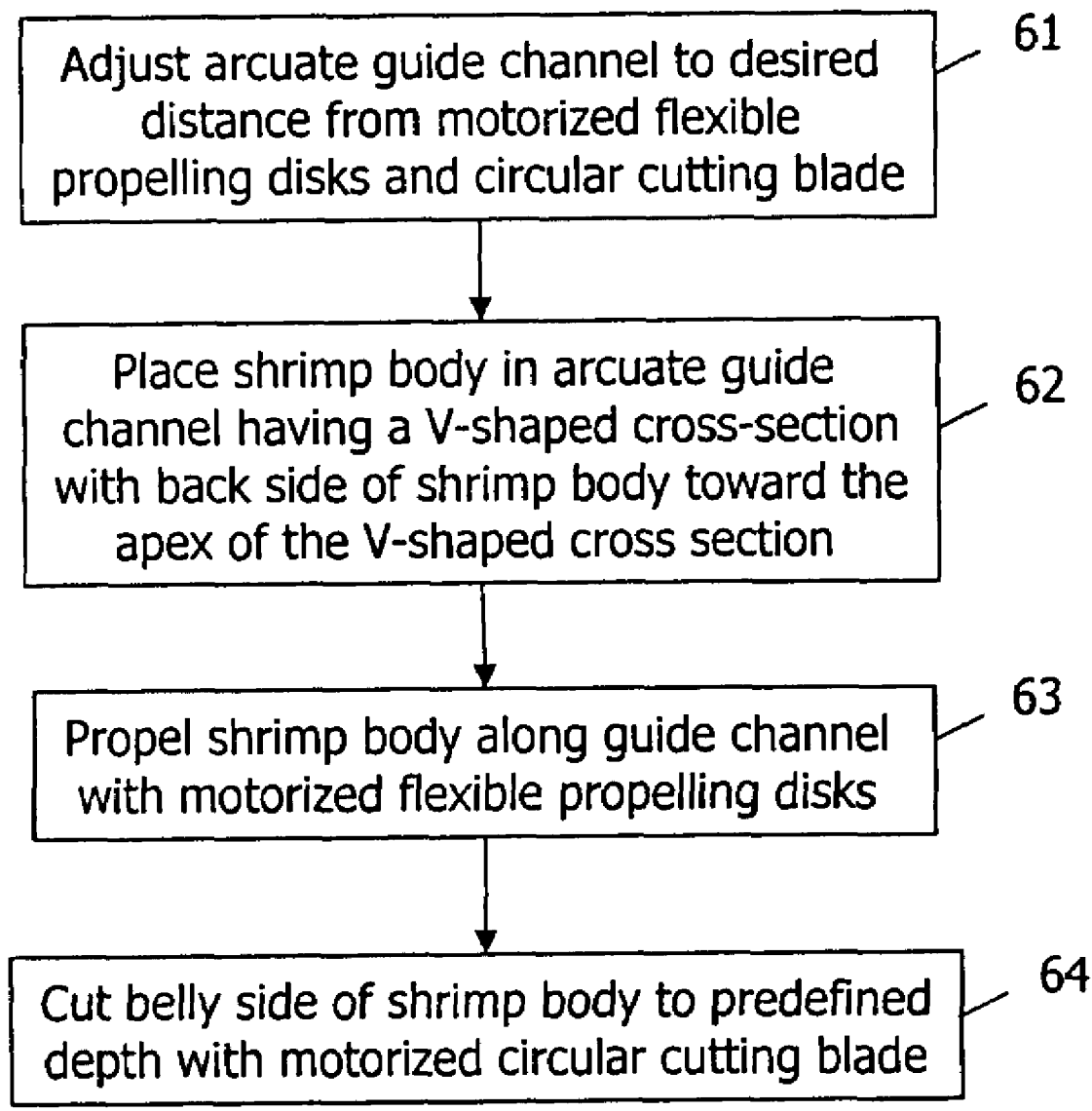
FIG. 5 is a flow chart illustrating the steps of an exemplary embodiment of the method of the present invention.

FIG. 5 is a flow chart illustrating the steps of an exemplary embodiment of the method of the present invention. At step 61, the curved channel guide 37 is adjusted to a desired distance from the motorized flexible propelling disks 36 and the circular cutting blade 38. At step 62, the shrimp body is placed in the curved channel guide with the back side of the shrimp body facing the apex of the V-shaped cross-section of the channel guide. At step 63, the shrimp body is propelled along the guide channel by the motorized propelling disks. The shape of the channel guide and the flexible propelling disks 36 stabilize the shrimp body so that the belly side remains centered as the shrimp body approaches the circular cutting blade. At step 64, the circular cutting blade cuts the belly side of the shrimp body to the predefined depth, accounting for the size of the shrimp body.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention as defined by the following claims.

What is claimed is:

1. An apparatus for mechanically belly-cutting a shrimp body having a belly side and a back side, said apparatus comprising:
    a motorized circular cutting blade;
    a guide channel adjacent the circular cutting blade for receiving a shrimp body placed into the apparatus and guiding the shrimp body to the circular cutting blade; and
    motorized means adjacent to the circular cutting blade and the guide channel for gripping the shrimp body and propelling the shrimp body along the guide channel in a manner that the circular cutting blade impacts the belly side of the shrimp body.

2. The apparatus as recited in claim 1, wherein the guide channel is an arcuate channel having a V-shaped cross-section, and the shrimp body is placed in the guide channel with the back side of the shrimp body facing an apex of the V-shaped cross-section, wherein:
    the arcuate guide channel has a radius of curvature that longitudinally stabilizes the shrimp body as the body is propelled along the guide channel; and
    the V-shaped cross-section laterally stabilizes the shrimp body as the body is propelled along the guide channel.

3. The apparatus as recited in claim 1, further comprising an adjustment mechanism for adjusting a position of the guide channel in relation to the means for gripping and propelling the shrimp body and the circular cutting blade, wherein the apparatus mechanically belly-cuts shrimp bodies of various sizes to predefined depths.

4. The apparatus as recited in claim 1, wherein the motorized circular cutting blade and the motorized means for gripping and propelling the shrimp body are driven by a motorized belt-and-pulley system contained within a housing, said housing being sealed to prevent fluids and debris from the cut shrimp body from entering the housing.

5. The apparatus as recited in claim 4, wherein the motorized belt-and-pulley system rotates the motorized circular cutting blade and the motorized means for gripping and propelling the shrimp body in the same direction.

6. The apparatus as recited in claim 5, wherein the means for gripping and propelling the shrimp body includes a pair of flexible disks mounted on a rotating shaft which extends through a sealed aperture in the housing, said shaft being rotated by the motorized belt-and-pulley system.

7. The apparatus as recited in claim 6, wherein the pair of flexible disks diverge at greater distances from the shaft to firmly grasp the shrimp body when the shrimp body is placed between the flexible disks and the guide channel.

8. An apparatus for mechanically belly-cutting a shrimp body having a belly side and a back side, said apparatus comprising:
    a motorized circular cutting blade;
    a guide channel adjacent the circular cutting blade for receiving a shrimp body placed into the apparatus and guiding the shrimp body to the circular cutting blade, wherein the guide channel is an arcuate channel having a V-shaped cross-section, and the shrimp body is placed in the guide channel with the back side of the shrimp body facing an apex of the V-shaped cross-section, wherein:
        the arcuate guide channel has a radius of curvature that longitudinally stabilizes the shrimp body as the body is propelled along the guide channel; and
        the V-shaped cross-section laterally stabilizes the shrimp body as the body is propelled along the guide channel;
    motorized means adjacent to the circular cutting blade and the guide channel for gripping the shrimp body and propelling the shrimp body along the guide channel in a manner that the circular cutting blade impacts the belly side of the shrimp body; and
    an adjustment mechanism for adjusting a position of the guide channel in relation to the means for gripping and propelling the shrimp body and the circular cutting blade, wherein the apparatus mechanically belly-cuts shrimp bodies of various sizes to predefined depths.

9. The apparatus as recited in claim 8, wherein the motorized circular cutting blade and the motorized means for gripping and propelling the shrimp body are driven by a motorized belt-and-pulley system contained within a housing, said housing being sealed to prevent fluids and debris from the cut shrimp body from entering the housing.

10. The apparatus as recited in claim 9, wherein the motorized belt-and-pulley system rotates the motorized circular cutting blade and the motorized means for gripping and propelling the shrimp body in the same direction.

11. The apparatus as recited in claim 10, wherein the means for gripping and propelling the shrimp body includes a pair of flexible disks mounted on a rotating shaft which extends through a sealed aperture in the housing, said shaft being rotated by the motorized belt-and-pulley system.

12. The apparatus as recited in claim 11, wherein the pair of flexible disks diverge at greater distances from the shaft to firmly grasp the shrimp body when the shrimp body is placed between the flexible disks and the guide channel.

13. A method of mechanically belly-cutting a shrimp body having a belly side and a back side, said method comprising the steps of:
    placing the shrimp body in an arcuate guide channel having a V-shaped cross-section, wherein the shrimp body is placed in the guide channel with the back side of the shrimp body facing an apex of the V-shaped cross-section so that a radius of curvature of the guide channel longitudinally stabilizes the shrimp body as the body moves along the guide channel, and the V-shaped cross-section laterally stabilizes the shrimp body as the body moves along the guide channel;
    propelling the shrimp body along the guide channel with a motorized propelling mechanism; and
    cutting the belly side of the shrimp body with a motorized circular cutting blade;

wherein the guide channel positions and stabilizes the shrimp body so that the circular cutting blade impacts the belly side of the shrimp body.

14. The method as recited in claim 13, further comprising adjusting a position of the guide channel in relation to the motorized propelling mechanism and the circular cutting blade, wherein shrimp bodies of various sizes are mechanically belly-cut to predefined depths.

* * * * *